(12) United States Patent
Maloney et al.

(10) Patent No.: US 10,954,977 B2
(45) Date of Patent: Mar. 23, 2021

(54) INSERT FASTENER WITH A COMPRESSION SLEEVE

(71) Applicant: Penn Engineering & Manufacturing Corp., Danboro, PA (US)

(72) Inventors: Michael J. Maloney, Doylestown, PA (US); Brian G. Bentrim, Furlong, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 239 days.

(21) Appl. No.: 16/104,086

(22) Filed: Aug. 16, 2018

(65) Prior Publication Data

US 2019/0055971 A1    Feb. 21, 2019

Related U.S. Application Data

(60) Provisional application No. 62/546,065, filed on Aug. 16, 2017.

(51) Int. Cl.
*F16B 5/02* (2006.01)
*F16B 39/284* (2006.01)
*F16B 37/04* (2006.01)
*F16B 37/12* (2006.01)
*F16B 33/00* (2006.01)

(52) U.S. Cl.
CPC .......... *F16B 5/0208* (2013.01); *F16B 5/0258* (2013.01); *F16B 33/002* (2013.01); *F16B 37/048* (2013.01); *F16B 37/122* (2013.01); *F16B 39/284* (2013.01)

(58) Field of Classification Search
CPC .... F16B 37/122; F16B 37/048; F16B 5/0258; F16B 5/0208; F16B 39/284; F16B 33/002; F16B 13/0858
USPC .................................................. 411/166, 178
See application file for complete search history.

(56) References Cited

U.S. PATENT DOCUMENTS

| | | | | | |
|---|---|---|---|---|---|
| 2,120,577 | A | * | 6/1938 | Schulte | F16B 13/0858 411/71 |
| 2,550,867 | A | * | 5/1951 | Rosan | F16B 39/10 411/116 |
| 2,577,810 | A | * | 12/1951 | Rosan | F16B 37/122 411/109 |
| 2,685,320 | A | * | 8/1954 | Rosan | F16B 35/04 411/180 |

(Continued)

FOREIGN PATENT DOCUMENTS

WO    2018135996    7/2018

*Primary Examiner* — Victor D Batson
*Assistant Examiner* — Amit Singh Dhillon
(74) *Attorney, Agent, or Firm* — Gregory J. Gore, Esq.

(57) ABSTRACT

A two-part fastener with an insert and a compression sleeve. The insert is an internally-threaded fastener intended to be installed into a hole of a very hard panel. The insert itself is relatively hard with a knurled outer barrel portion and a flange at the bottom. A compression sleeve is made of relatively soft material and is preassembled around the barrel of the insert by friction fit. Upon installation into a panel with a blind hole having parallel sides, the compression sleeve is pressed into the panel and deforms outwardly between the insert and the side wall of the hole. Friction between the compression sleeve and the wall of the hole prevents torque out and pull out of the fastener from the panel.

24 Claims, 5 Drawing Sheets

(56) References Cited

U.S. PATENT DOCUMENTS

| | | | | |
|---|---|---|---|---|
| 2,686,547 | A | * | 8/1954 | Becker .................. F16B 37/048 411/427 |
| 2,728,370 | A | * | 12/1955 | Neuschotz ............ F16B 37/122 411/103 |
| 2,754,882 | A | * | 7/1956 | Rosan .................. F16B 37/122 411/108 |
| 3,281,173 | A | * | 10/1966 | Rosan .................. F16B 37/122 403/242 |
| 3,512,328 | A | * | 5/1970 | Eriksson .................. F16B 5/01 52/787.1 |
| 3,651,563 | A | * | 3/1972 | Volkmann ................. F16B 5/01 29/523 |
| 4,032,177 | A | | 6/1977 | Anderson |
| 4,143,579 | A | * | 3/1979 | Ziaylek, Jr. ........... F16B 37/122 411/42 |
| 4,376,604 | A | | 3/1983 | Pratt et al. |
| 4,717,612 | A | * | 1/1988 | Shackelford .............. B32B 3/12 428/116 |
| 5,238,342 | A | * | 8/1993 | Stencel ............... F16B 19/1036 411/329 |
| 7,195,436 | B1 | | 3/2007 | Stephen |
| 2008/0206013 | A1 | * | 8/2008 | Bentrim ................ F16B 37/068 411/180 |
| 2010/0171307 | A1 | | 7/2010 | Tymkewicz |
| 2010/0175811 | A1 | * | 7/2010 | Kumai .................. B29C 66/474 156/91 |
| 2011/0062617 | A1 | * | 3/2011 | Lehmann ............. B29C 65/562 264/71 |

\* cited by examiner

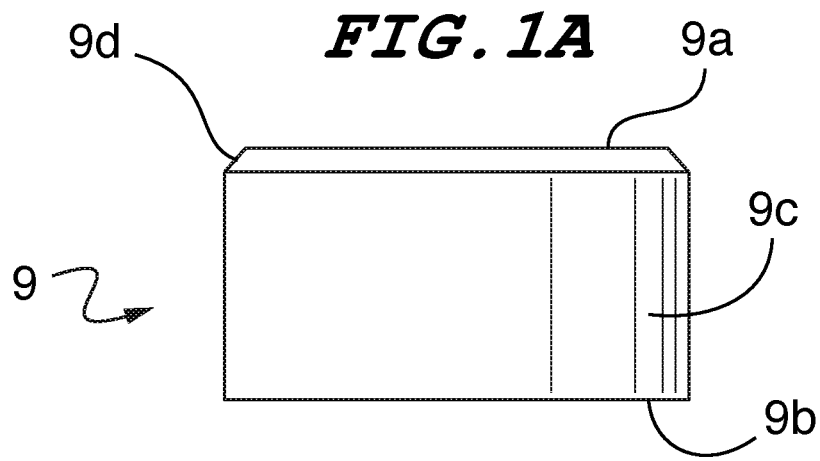
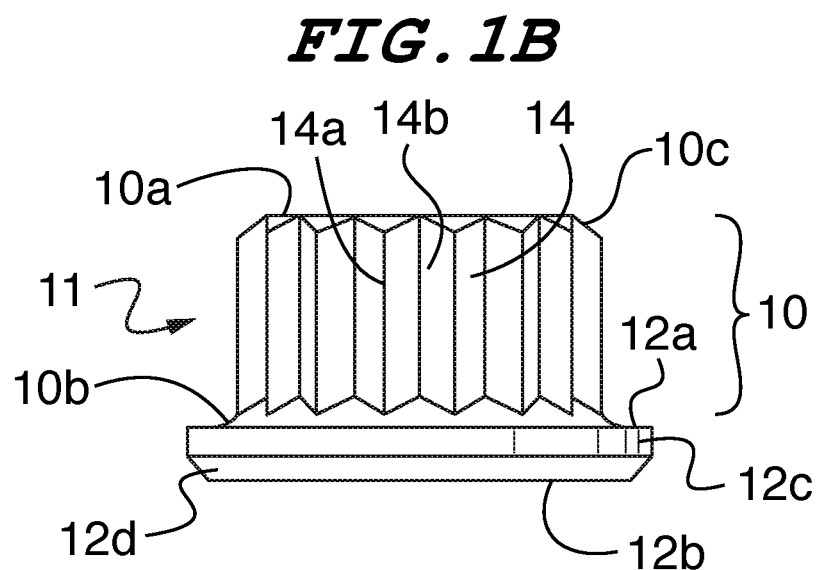
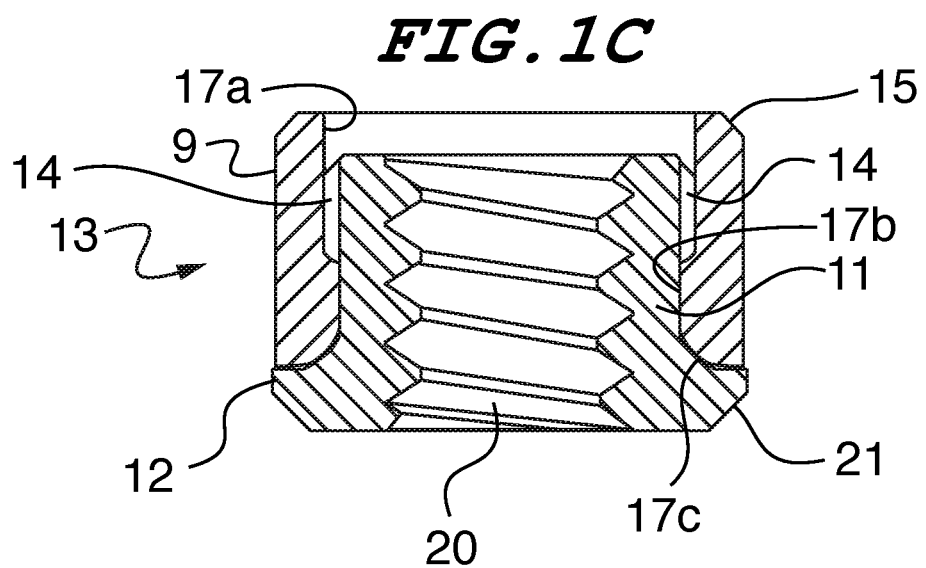

INSERT FASTENER WITH A COMPRESSION SLEEVE

CROSS-REFERENCE TO RELATED APPLICATIONS

This application is a non-provisional patent application claiming the benefit of provisional patent application No. 62/546,065 filed Aug. 16, 2017 entitled, "Pressure Sleeve Insert", priority from which is hereby claimed.

FIELD OF THE INVENTION

The present invention relates to metal fasteners. More specifically, the invention relates to fastening systems that employ an intermediate sleeve or insert to attach it in a hole in a receiving panel.

BACKGROUND OF THE INVENTION

Clinching fasteners require a hardness differential between the fastener and the panel into which they are installed. If the fastener is not significantly harder than the panel, no material flow of the panel into the fastener undercut can occur to lock it in place. In situations where the panel is harder than the fastener, the clinching fastener can in fact be damaged, and will not clinch.

Because of this limitation, typical methods of affixing a threaded insert in hard panels include adhesives, soldering or welding. Adhesives can be messy and have the added disadvantage of a long cure time prior to fully fixing the fastener. Soldering and welding require high temperatures that can easily damage the cosmetics, or even the geometry of the assembly. Therefore, it would be desirable to provide a threaded attachment means that can be successfully used with very hard materials. It would also be desirable to provide such a fastener than can be effectively and economically manufactured and used.

SUMMARY OF THE INVENTION

The present invention comprises a press-in, threaded fastener intended for installation into a hole in a very hard panel. The press-in fastener has enhanced torque-out and pull-out performance compared to the prior art. The press-in fastener has a simple, two-piece construction that can be easily assembled and installed with a single stroke of an installation press.

In preferred embodiments, the threaded insert is relatively hard, has a knurled barrel at one end, and a flange at an opposed bottom end. A deformable sleeve of relatively soft material is preassembled on the barrel by axial pressing. Upon installation in a blind receiving hole having parallel sides, the sleeve is axially compressed and expands into the space between the insert and the side wall of the receiving hole. Friction between the compression sleeve and the wall of the hole prevent torque out and pull out of the press-in fastener from the panel.

In another preferred embodiment, the invention comprises a two-part fastener comprising a threaded insert and a compression sleeve. The insert is generally-cylindrical and made of a first hard material. The insert has an internal, threaded through-bore. The insert has a barrel with knurls on the outer surface, and a flange at the bottom end thereof. Preferably, the knurls comprise axially-extending teeth.

The compression sleeve is generally-cylindrical, deformable and made of a second material softer than the first material of the insert. The bottom end of the sleeve abuts the top of the flange. A bottom portion of the sleeve is rigidly affixed around a lower portion of the barrel by friction fit. A top portion of the sleeve has an enlarged internal diameter radially spaced away from an upper portion of the barrel.

Preferably, the top of the sleeve, top of the insert, and the bottom of the flange have chamfers. The outer diameter of the flange is approximately equal to the outer diameter of the compression sleeve. The top end of the sleeve extends upwardly beyond the top of the insert so that during assembly, material from the top of the sleeve can be compressed downwardly and cold flows around the insert, finishing in flush attachment with both the insert and the top surface of the panel to which it is assembled.

In another embodiment, the invention comprises an assembly of a panel and the two-part fastener described above. The fastener is rigidly affixed in a receiving hole in the panel by friction fit and optional interlocking engagement with an undercut in the receiving hole wall. The receiving hole can be a blind hole with a bottom end wall that abuts the bottom of the insert. The friction fit between the insert and the panel is enhanced by the compressive deformation of the sleeve between the insert and the panel, wherein the deformed sleeve substantially fills the space between the insert and the panel. In one optional embodiment, the side wall of the panel hole has one or more undercuts adapted to receive the flow of material from the sleeve when compressed. The sleeve is preferably composed of a metal, such as aluminum, which is softer than the material of the panel.

In a further embodiment, the invention comprises a method of assembling the above-described, two-part fastener to the panel. The two-part fastener is initially placed into a receiving hole in the panel. Then, the top of the sleeve is pressed downwardly, which forces the bottom of the sleeve against the top of the insert flange and into any space between the sleeve and the wall of the receiving hole. As it is compressed, the sleeve also deforms around the knurls and against the side wall of the receiving hole. Preferably, pressing is continued until the sleeve material substantially fills the space between the insert and the inner wall of the receiving hole, and until the top of the sleeve lies flush with the top of the panel.

BRIEF DESCRIPTION OF THE DRAWINGS

FIG. 1A is a side elevation of a the compression sleeve of a fastener in accordance with a preferred embodiment of the invention;

FIG. 1B is a side elevation of the insert of a fastener in accordance with a preferred embodiment of the invention;

FIG. 1C is a cross section of a fastener in accordance with a preferred embodiment of the invention showing the compression sleeve and insert of FIGS. 1A and 1B;

DESCRIPTION OF THE INVENTION

Figure 2:
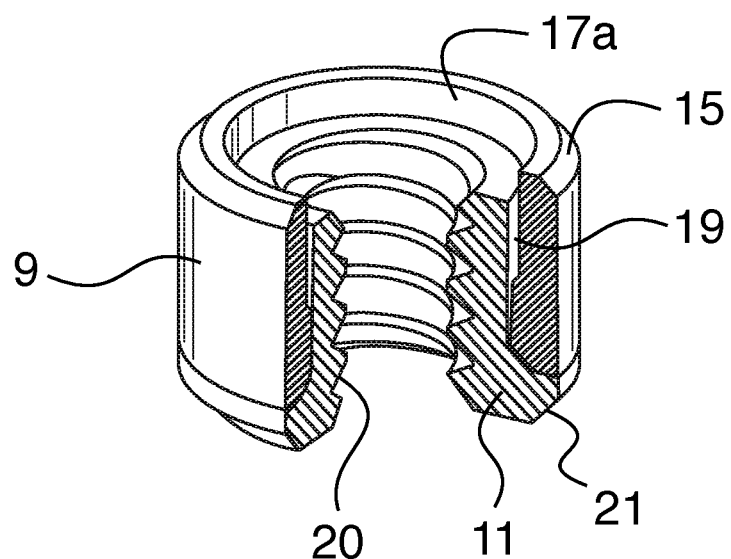
FIG. 2 is partially-sectioned perspective view of the fastener shown in FIG. 1C.

A fastener in accordance with a preferred embodiment of the invention is shown in FIGS. 1-5 and is designated generally by reference numeral 13. The two-part fastener generally comprises a compression sleeve 9 and an insert 11 that are pre-assembled as shown in FIGS. 1C and 2-5. The compression sleeve 9 is shown in isolation in FIG. 1A while the insert 11 is shown in isolation in FIG. 1B.

Figure 3:
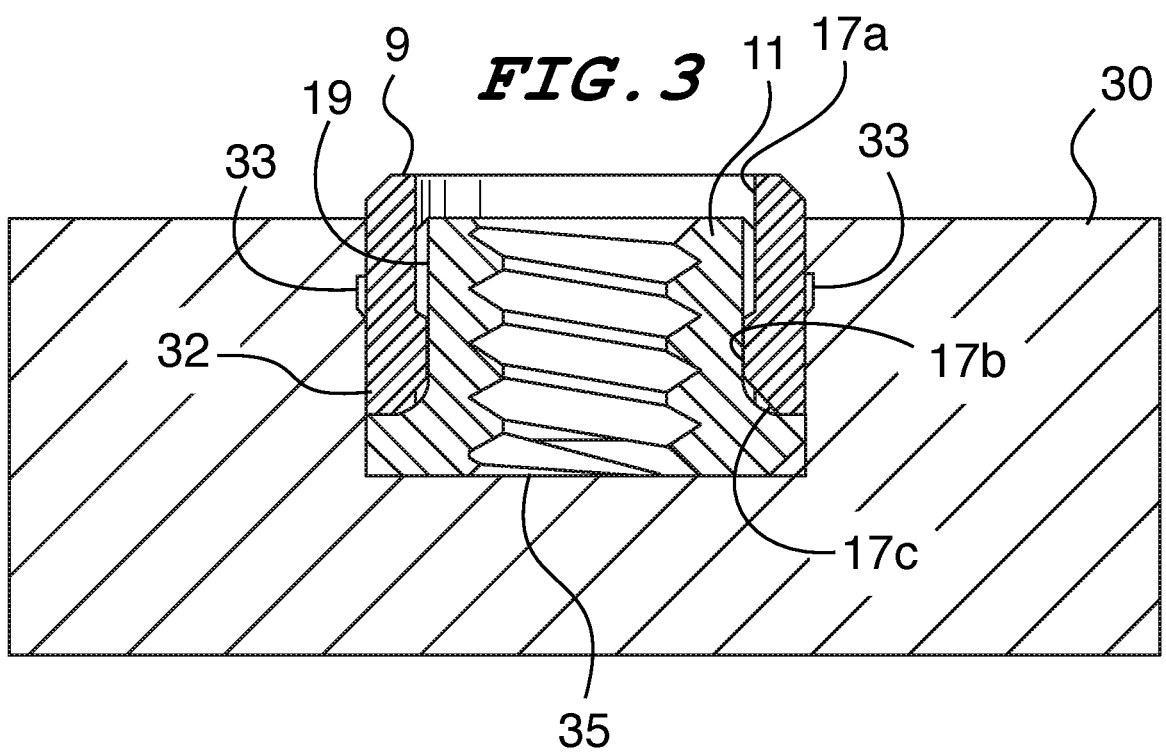
FIGS. 3, 4, and 5 are cross sections showing the fastener of FIG. 1C in a host panel at three different installation steps in accordance with preferred embodiments of the invention.

The compression sleeve 9 has a generally-cylindrical shape with a top end 9a, bottom end 9b, outer side walls 9c, and a top chamfer 9d. The inner side walls define an axial bore extending through the compression sleeve 9. As best seen in FIGS. 1C and 3, the inner surface of the compression sleeve 9 has an upper portion 17a, a lower portion 17b and a bottom chamfer 17c. The upper portion 17a has a larger inner diameter than the lower portion 17b. The diameter of the chamfer 17c increases from the lower portion 17b to the bottom end 9b of the compression sleeve 9.

In the preferred embodiment shown in FIGS. 1-5, the insert 11 has a cylindrical barrel 10 with a top end 10a, bottom end 10b, and an upper chamfer 10c as best seen in FIG. 1B. The inner side walls define an axial, threaded bore extending through the insert 11. The threads 20 in the bore are designed to cooperate with a variety of externally-threaded fasteners. The outer surface of the side wall is knurled. The knurls 14 extend axially from the top end 10a to the bottom end 10b, and are positioned around the entire circumference of the barrel 10. As discussed below, the knurls prevent rotation between the insert 11 and the compression sleeve 9.

The bottom end 10b of the barrel terminates at a radial flange 12 having a maximum diameter larger than the diameter of the insert at the apex 14a of the knurls 14. The flange has a top surface 12a, a bottom surface 12b, a cylindrical outer surface 12c, and a bottom chamfer 12d.

Figure 4:
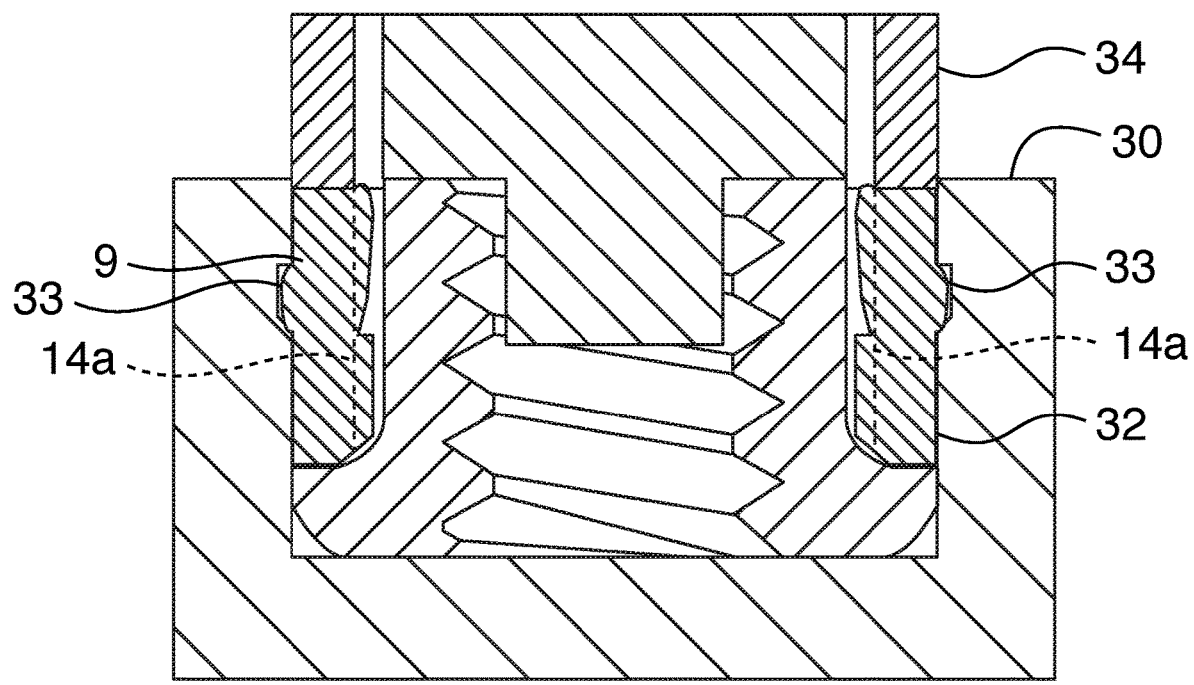
Figure 5:
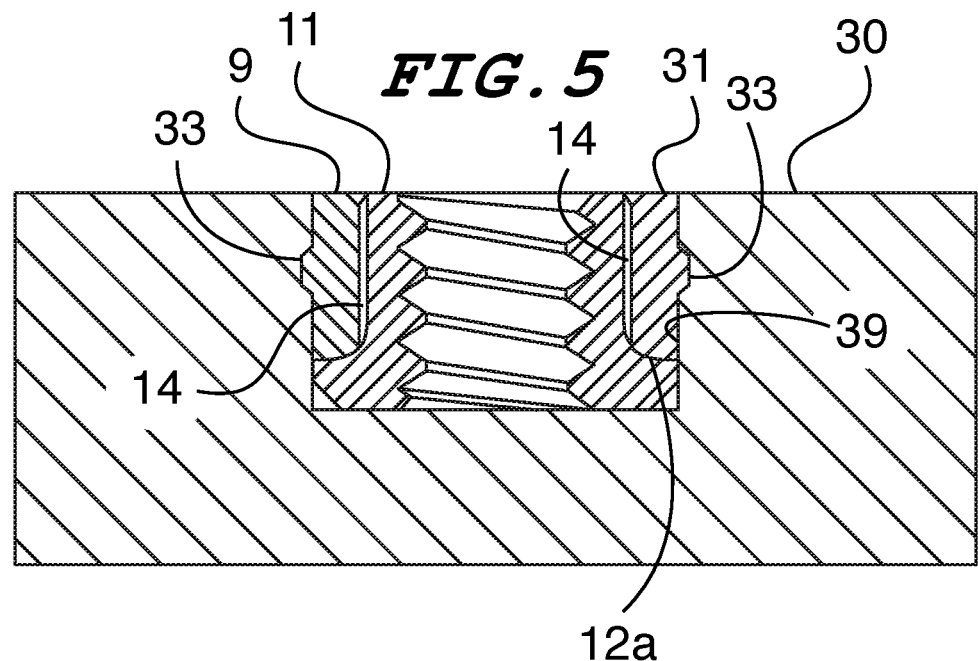

The compression sleeve 9 is constructed to be retained on the barrel 10 of the insert 11 by an interference fit between the knurls 14 and the lower portion 17b of the inner surface of the compression sleeve 9. The assembled compression sleeve 9 and insert 11 are shown in FIG. 1C and FIGS. 2-5. In FIGS. 1C and 2, the pre-assembled, two-part fastener 13 is shown prior to installation in a receiving hole 32 of a host panel 30. FIGS. 3-5 show the fastener 13 inserted and installed in the receiving hole 32 of a host panel 30.

Referring to FIGS. 1C, 2 and 3, when the compression sleeve 9 and insert 11 are assembled, a gap 19 is formed between valleys of the knurls 14 and the upper portion 17a of the inner surface 17 of the compression sleeve 9. Referring to FIG. 1C, the cross section shows an embodiment where the inner diameter of the upper portion 17a of the compression sleeve 9 is approximately equal to the diameter of the insert 11 at the apex 14a of the knurls 14; therefore, they abut at the interface shown therein. In FIGS. 1C and 3, since these cross sections are taken directly through the bottom 14b of the valley of opposed knurls 14, reference numeral 14 identifies the solid surface of the knurls 14. However, it should be appreciated that there is a void 19 between the knurl (knurl valley) in front of and behind (with reference to an axis extending perpendicular to the page of FIG. 3) these opposed knurls as best seen in FIG. 2.

In contrast, the diameter of the inner surface of the lower portion 17b of the insert 11 is smaller than the upper portion 17a and may approximate the outer diameter of the insert 11 at the bottom 14b of the knurls 14; therefore, the compression sleeve can be force fitted onto the knurls 14, which will embed into the lower inner surface 17b of the compression sleeve 9.

FIGS. 1C and 3 show an embodiment in which material from the compression sleeve 9 cold deforms completely to the bottom of each knurl valley. However, in other embodiments, cold-deformed material from the compression sleeve 9 only partially fills the knurl valleys without departing from the scope of the invention. For example, FIG. 4 shows in dotted line the hidden view of the apex 14a of the opposed knurls. FIG. 4 shows how the compression sleeve is cold deformed over the apex 14a but not the entire knurl 14.

The enlarged inner diameter at the upper portion 17a of the compression sleeve is provided to accommodate for production tolerances of the compression sleeve and insert. For example, without these voids 19, if the compression sleeve had an oversized dimension, it might not completely compress within the voids, which would result in sleeve material protruding above the panel. Similarly, the upper chamfer 10c of the insert also provides additional volume into which excess compression sleeve material may cold deform. Therefore, in preferred embodiments, the volume of the compression sleeve 9 that initially protrudes above the panel 30 prior to installation should be less than the total volume of the voids 19 between the knurls 14 and the inner surface of the compression sleeve 9, plus any empty space between the outer surface of the compression sleeve 9 and walls 39 of the receiving hole in the panel, including any optional undercut 33. The respective total volumes could theoretically be equal; however, due to incomplete cold deformation into the bottom 14b of the knurl valleys and corners of the optional undercut 33, the volume of the protruding portion of the compression sleeve 9 should be less than the total volume of empty space.

FIGS. 3, 4 and 5 show the fastener 13 in three different, sequential steps during installation into a blind receiving hole in a host panel 30 having a bottom end wall 35. First, the fastener 13 is inserted into the blind hole in the orientation shown in FIG. 3. In a preferred embodiment, the insert 11 and sleeve 9 are dimensioned so that the compression sleeve 9 protrudes partially out of the hole above the surface of the panel. The protruding portion makes it easier to apply an axial compressive load compared to a sleeve that is initially flush with the panel and/or insert. In the preferred embodiment shown in FIG. 3, the insert 11 is dimensioned so that its axial length is equal to the depth of the hole. The chamfer 12d on the bottom of the insert leads the fastener easily into the receiving hole.

Figure 7:
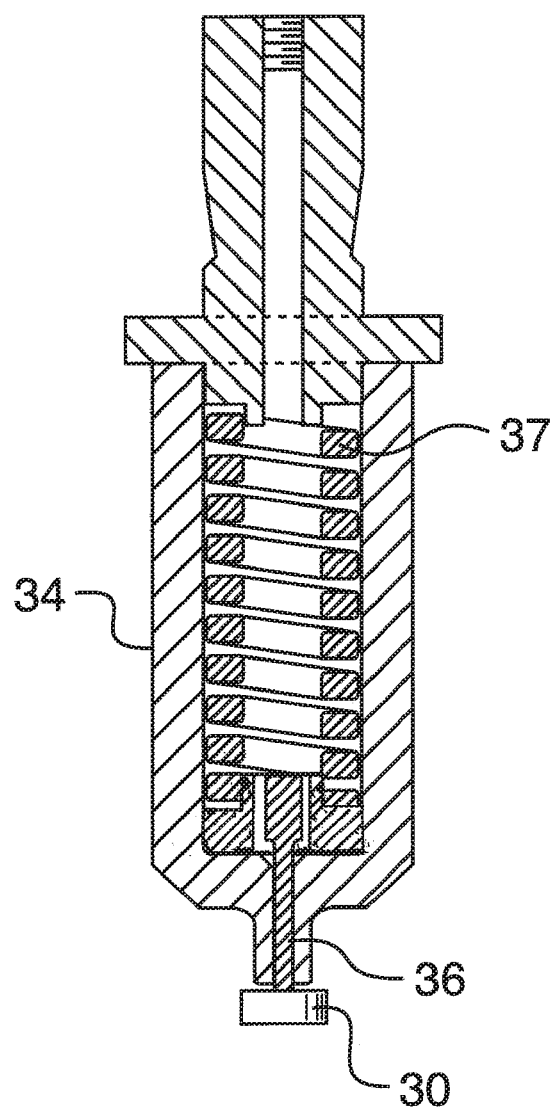
FIG. 7 is a section view of an installation press punch and fastener in the beginning position of installation; and, FIG. 8 is a cross section of the tip of the installation press punch, fastener and receiving panel 30 staged for installation.

Next, a specialized punch 34, shown in greater detail in FIG. 7, engages the fastener 13 and presses the compression sleeve 9 downwardly. During installation, the punch 34 presses downwardly on the fastener 13 until the top surface 9a of the sleeve 9 lies flush or slightly sub-flush with top of the panel and the top of the insert 11, which in this embodiment is the top surface 10a of the barrel 10. As described above, the volume of metal of the compression sleeve 9 that initially protrudes above the panel 30 prior to installation should be equal to or less than the total empty space in the assembly. This measurement ensures that the final configuration of the compressed compression sleeve 9 lies flush with or slightly below the top surface of the panel 30 when installed. Pressure generated within the compressed compression sleeve material retains the fastener 13 in the hole.

FIG. 4 shows a simulated cross section of how the compression sleeve material, which previously extended above the panel, is urged downward between the knurls 14 of the insert 11 and against the inner wall 39 of the installation hole 32. The top chamfer 9d biases the compression sleeve material inwardly to collapse toward the insert 11. Material from the compression sleeve bulges farther inwardly near the top of the compression sleeve compared to the shoulder between the upper portion 17 and lower portion 17b. FIG. 4 also shows how material from the compression sleeve bulges into the optional undercut 33. The sleeve material need not completely fill the knurl valleys or undercut 33 to achieve increased pullout resistance.

FIG. 5 shows another profile of the final condition of the compression sleeve 9 in mechanical engagement with the optional undercut 33, against the knurls 14, against the top surface 12a of the flange 12, and against the side wall 39 of the receiving hole. This combination of mechanical engagement constrains the insert 11 against pull out and torque out forces.

Figure 6:
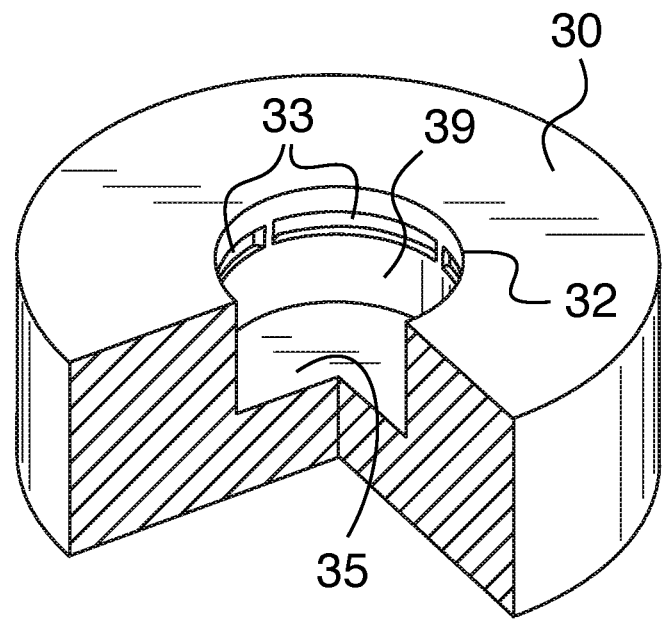
FIG. 6 is a partially-sectioned perspective of a fastener in accordance with another preferred embodiment of the invention.

FIG. 6 depicts one preferred embodiment of the receiving hole 32 of the panel 30, which is the same as the hole shown in FIGS. 3 through 5. The receiving hole 32 includes the optional undercut 33 in the side wall 39 to increase the resistive pull-out force due to the shear strength of metal that gets cold deformed into the undercut 33. In this embodiment, the undercut 33 is segmented into a plurality of smaller undercuts 33, which construction provides additional torque resistance.

Figure 8:
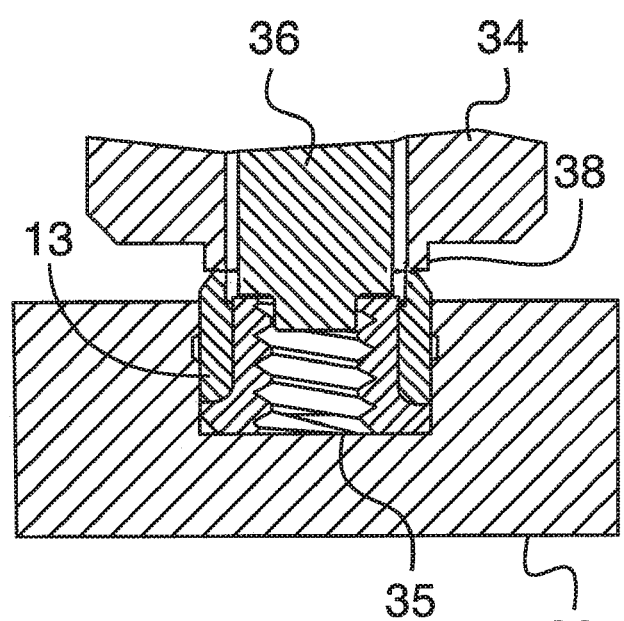

FIG. 7 shows a cross section of an installation press punch in accordance with a preferred embodiment of the invention. FIG. 8 is an enlarged section from FIG. 7, which shows a close-up of the tip 38 of the punch 34 during initial installation impact on the fastener 13 and a cross section of the receiving panel 30. During installation, a vacuum is applied to the core of the punch 34, which thereby holds a fastener 13 on its tip. A spring 37 within the body of the punch presses on a piston 36, which seats the fastener 13 firmly against the bottom 35 of the installation hole. As the punch 34 advances downwardly and deforms the compression sleeve 9 as seen in FIGS. 3 through 5, the spring 37 compresses and exerts a downward force on the displacer tip 38, which deforms the sleeve 9 as described above, thereby locking the fastener 13 in place. In this way, the two pre-assembled parts (compression sleeve 9 and insert 11) are installed into the receiving hole in a single stroke of the press punch 34.

The compression sleeve 9 can be made of any permanently-deformable material. In a preferred embodiment, the compression sleeve can be made of a material that can be hardened at a reasonable temperature after installation, which will significantly increase the pull-out and torque-out resistance of the insert. For example, 7075-T4 aluminum is one preferred material for the sleeve material because it can be heat treated at a relatively low temperature to a much stronger T6 condition after being installed. In another embodiment, the geometry of the bottom of the hole could also be tapered by design to match the insert being installed.

It will be apparent to those of skill in the art that many variations and adaptions of the disclosed embodiments are possible. Thus, it should be understood that the embodiments disclosed are to be considered as exemplary only. All variations and adaptations of those embodiments are within the scope and spirit of the invention, which shall be determined by the claims and their legal equivalents.

The invention claimed is:

1. A two-part fastener, comprising:
an insert having a barrel with knurls on an outer surface thereof;
a flange on said insert at a bottom end thereof; and,
a deformable sleeve having:
a bottom end abutting a top of said flange;
a bottom portion rigidly affixed around a lower portion of said barrel by friction fit; and,
a topmost portion with an enlarged internal diameter axially adjacent and radially spaced away from an upper portion of said barrel; and,
wherein a top end of the sleeve extends upwardly beyond a top of the insert.

2. The device of claim 1 wherein the knurls comprise axially-extending teeth.

3. The device of claim 2 wherein the bottom of the flange has a chamfer.

4. The device of claim 3 wherein the insert has an axial through-bore.

5. The device of claim 4 wherein the through-bore is threaded.

6. The device of claim 5 wherein the sleeve has an upward facing chamfer on a top surface thereof.

7. The device of claim 6 wherein a diameter of the flange is approximately equal to an outer diameter of the sleeve.

8. An assembly comprising
a) a panel having a receiving hole; and,
b) a two-part fastener having:
i) an insert having a barrel with knurls on an outer surface thereof;
ii) a flange on said insert at a bottom end thereof; and,
iii) deformable sleeve including;
a bottom end abutting a top of said flange;
a bottom portion rigidly affixed around a lower portion of said barrel by friction lit; and,
a topmost portion with an enlarged internal diameter axially adjacent and axially spaced away from an upper portion of said barrel;
wherein said two-part fastener is rigidly affixed in said receiving hole by friction fit; and,
wherein a top end of the sleeve extends upwardly beyond a top of the insert.

9. The assembly of claim 8 wherein said receiving hole is a blind hole with a bottom end wall.

10. The assembly of claim 9 wherein the friction fit between said insert and the panel is enhanced by the axially-compressive deformation of said sleeve filling empty space between said insert and the panel, and filing voids between said knurls.

11. The assembly of claim 10 wherein said deformable sleeve fills the entire space between said insert and panel.

12. The assembly of claim 11 wherein said insert and sleeve lie flush with a top of said panel.

13. The assembly of claim 12 wherein a side wall of said receiving hole has a preformed undercut that is adapted to receive the flow of material of the sleeve.

14. The assembly of claim 13 wherein the side wall of said receiving hole has a plurality of undercuts.

15. The assembly of claim 10 wherein the bottom of said insert abuts the bottom end wall of said receiving hole.

16. The assembly of claim 10 wherein said panel is composed of a first metal, and said sleeve is composed of second metal.

17. The assembly of claim 16 wherein said sleeve is composed of aluminum.

18. A method of installing an insert into a panel, comprising the steps of:
 a) providing a panel having a blind hole;
 b) providing a two-part fastener having:
  i) an insert made of a first material and having a barrel with knurls on an outer surface thereof;
  ii) a flange on said insert at a bottom end thereof; and,
  iii) deformable sleeve made of a second material including:
   a bottom end abutting a top of said flange;
   a bottom portion rigidly affixed around a lower portion of said barrel by friction fit; and,
   a topmost portion with an enlarged internal diameter axially adjacent and radially spaced away from an upper portion of said barrel,
 c) placing the two-part fastener into the blind hole against its end wall;
 d) wherein a top end of the sleeve extends upwardly beyond a top of the insert; and,
 e) a step of pressing the sleeve downward against the top of flange whereby the sleeve deforms around the barrel and against a side wall of the blind hole without deforming the panel.

19. The method of claim 18 wherein the step of pressing is continued until the material of the sleeve completely fills the empty space between the insert and the side wall of the blind hole, and the top end of the sleeve lies flush with a top of the panel.

20. The method of claim 19 further including a step of heat treating the two-part fastener after the step of pressing.

21. The method of claim 18 wherein a length of the insert placed into the blind hole is equal to a depth of the blind hole.

22. The method of claim 21 wherein the insert has a chamfer on a top surface adapted to direct the flow of sleeve material inwardly during the step of pressing and to receive sleeve material on top of it flush with the panel.

23. The two-part fastener of claim 1 or the assembly of claim 8 wherein the sleeve is cylindrical.

24. The method of claim 21 wherein the top end of the sleeve extends above the insert and a volume of the sleeve above the insert is equal to a space between the insert and the panel.

* * * * *